Sept. 22, 1936.   O. U. ZERK   2,055,372
VEHICLE WHEEL
Filed Nov. 13, 1931   2 Sheets-Sheet 1
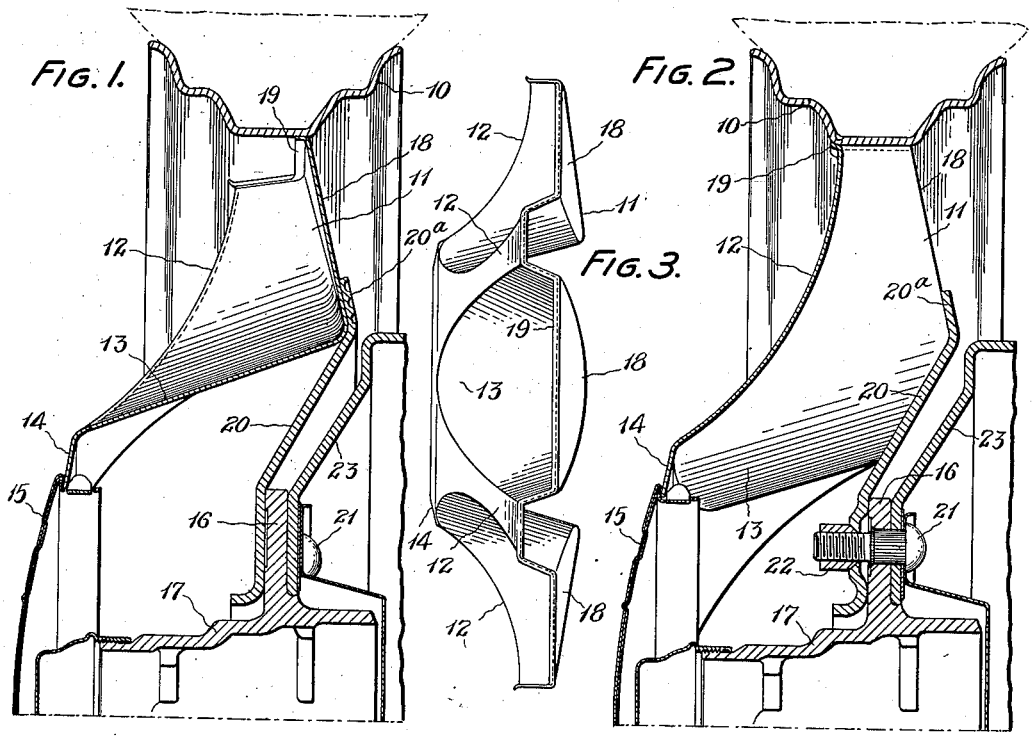
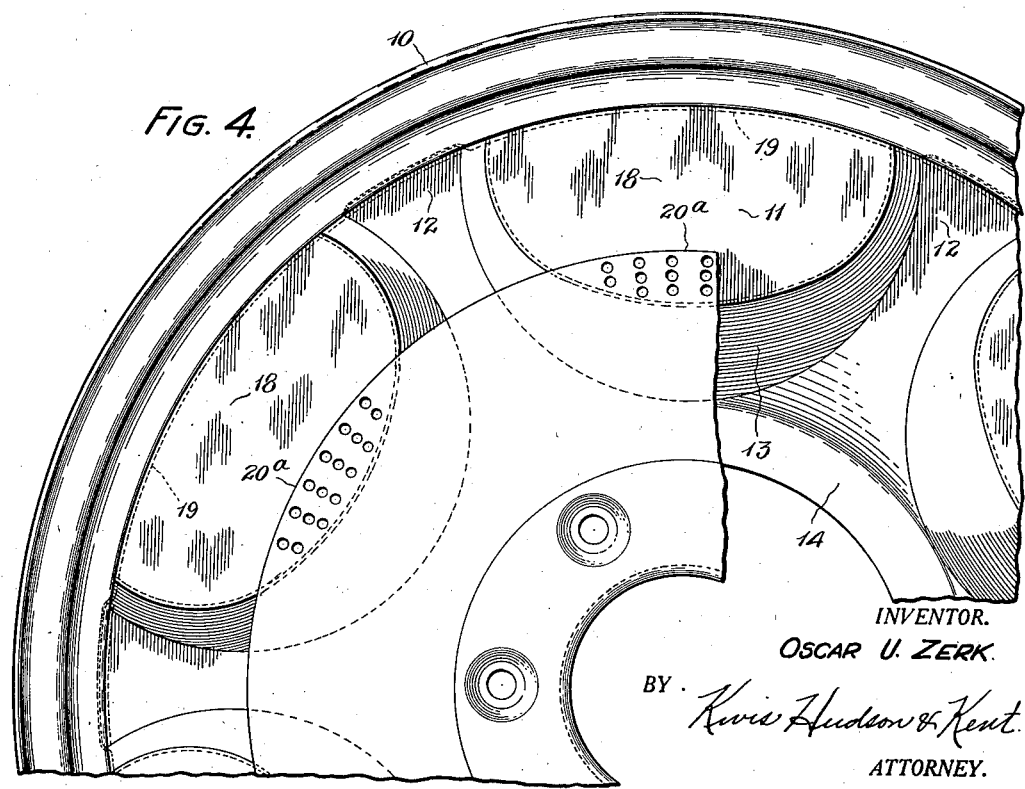
INVENTOR.
OSCAR U. ZERK.
BY
ATTORNEY.

Sept. 22, 1936.   O. U. ZERK   2,055,372
VEHICLE WHEEL
Filed Nov. 13, 1931   2 Sheets-Sheet 2
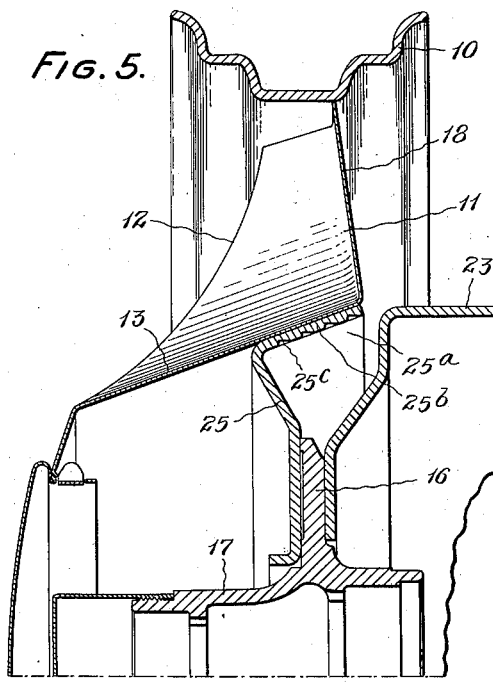
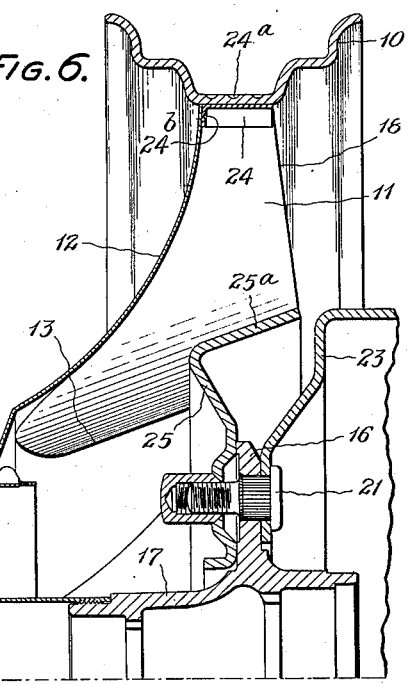
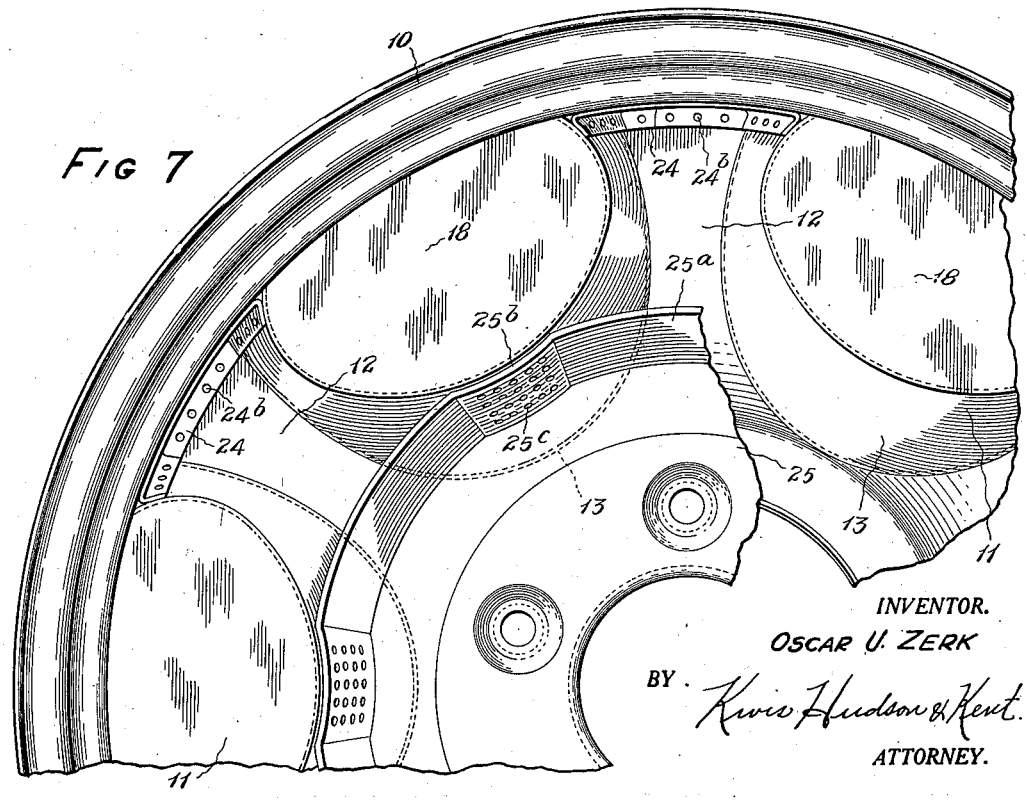
INVENTOR.
OSCAR U. ZERK
BY
ATTORNEY.

Patented Sept. 22, 1936

2,055,372

UNITED STATES PATENT OFFICE 2,055,372

VEHICLE WHEEL

Oscar U. Zerk, Cleveland, Ohio, assignor to Zerk Corporation, a corporation of Delaware Application November 13, 1931, Serial No. 574,817

11 Claims. (Cl. 301—9)

This invention relates to vehicle wheels of a modified disk type in which are embodied certain features and advantages of improved spoke type wheels disclosed and claimed in the following pending applications for Letters Patent of the United States, to-wit: No. 554,482, filed August 1, 1931; No. 560,162, filed August 29, 1931; No. 561,541, filed Sept. 8, 1931; No. 562,315, filed Sept. 11, 1931.

It is a feature of the wheels disclosed in all my applications referred to above that the wheel body is composed of a sheet metal spoke and outer hub unit which is designed to be provided with an attaching member adapted to be demountably secured to the inner hub and the outer ends of the spokes of which are adapted to be attached by welding or otherwise to the rim to complete the wheel. This sheet metal spoke and outer hub unit is of distinctly novel design and it imparts to the wheel many important advantages, to-wit, an appearance which is very pleasing and attractive to the eye, requisite strength coupled with a desirable degree of resiliency, simplicity of construction, minimum number of parts, ease of assembly, and reduced cost of manufacture.

This sheet metal unit has few spokes, such as five, six or seven, which are substantially U-shaped and are preferably provided with flaring sides. The smallest cross-section of the spoke is preferably located some distance inwardly of the rim toward the outer hub, and from this minimum cross-section to both the rim and the outer hub the spokes flare laterally. Additionally, the outer closed sides of the spokes flare outwardly and at the inner ends they merge with the outer hub portion of the unit. The outer hub is continuous only at its outer end, and inwardly of the outer end it is composed of the concavo-convex portions lying between the spokes, these concavo-convex portions being alternated with open spaces corresponding to the openings extending lengthwise of the hollow U-shaped spokes.

In all the applications referred to above, there are openings between the spokes, the width of which depends upon the number of spokes employed and the radial depth of which depends somewhat upon the size of the wheel and to some extent upon the size of the outer hub, and also on whether the outer hub is of a generally cylindrical shape or a generally conical shape, and, if the latter, upon the inclination or pitch of the cone. In any event, wheels which are distinctly of the spoke type are formed by the use of this spoke and outer hub unit, though the number of spokes is of course a great deal less than the number in wire wheels and even in wooden spoke wheels, and of course a further distinction between my improved wheel and spoke wheels of the types just mentioned, is the fact that the inner ends of the spokes of the wheels disclosed in my prior applications referred to, merge into and are integral with the outer hub, which is designed to receive a hub cap which in turn conceals the inner hub and also the wheel attaching bolts provided they are arranged inside the confines of the outer hub, as is the case with certain forms of wheels illustrated in said applications.

In accordance with the disclosures of my application Serial No. 560,162, the wheel is attached to and supported on a single flange of the inner hub. In accordance with the disclosures of my application Serial No. 561,541, the wheel is supported on two flanges of the inner hub and is secured to one of them. The wheel attaching flange may be secured to the hub portion of the spoke and outer hub unit in different ways, and the outer hub portion may be reenforced in any number of different ways if reenforcements are desired, as disclosed in my applications Serial No. 554,482 and Serial No. 561,541. In application Serial No. 560,162 I have disclosed many different ways in which the wheel may be demountably attached to the inner hub, and, as disclosed in the first three of the above mentioned applications, the wheel attaching bolts may be inside the outer hub or they may be arranged outwardly thereof, as disclosed in application Serial No. 562,315, this application illustrating an outer hub which is appropriately shaped to admit of exposed attaching bolts which extend through portions of the outer hub, and, if desired, also through outer hub reenforcements which may be arranged and applied in a variety of different ways.

From the above it will be seen that my sheet metal spoke and outer hub unit can be embodied and used to advantage in spoke type wheels of many specifically different forms and is adaptable by suitable selection of thickness or gauge of sheet metal employed and by the use or non-use of outer hub or both outer hub and spoke reenforcements, for vehicles of large as well as small size, or for heavy duty as well as light duty.

It is the principal object of the present invention to still further enlarge the field of use of my improvements by adapting them or the major portion of them to wheels of the disk type wherein the wheel body is composed of a spoke and outer hub unit, as before, but with this change that the body of the wheel is continuous at or between the spokes with the latter shaped by one or more pressing operations during the formative period so as to have the appearance of spokes and also the shape of the spoke wheel when viewed from the front.

Other objects are to embody in the web with the spokes pressed therein the desirable features of the spokes of my prior applications, as, for example to provide spokes which are narrower in cross-section between their ends than either at their outer ends or inner ends; to press in the web spokes which are U-shaped preferably with the sides flared and with the angle between the outer wall and the sides quite sharp; also to have the outer closed sides flared outwardly from their outer ends to their inner ends where the spokes merge into the outer hub so as to form an outer hub which is outstanding in an axial direction centrally about the axis of the wheel.

It is the object of the invention also to embody in this improved wheel the desirable features of the outer hub disclosed in part or all of the above mentioned pending applications, as, for example, an outer hub having at its outer end an inturned flange with a central opening formed therein adapted to be closed by a removable hub cap and also to secure the wheel attaching member either to the concavo-convex portions of the outer hub between the spokes, or to the web portions of the disk extending between the spokes, in which event the attaching member is secured to the rear or inner side of the wheel.

Further objects are to provide different modes of securing the body or disk of the wheel to the rim, as, for example, by welding the disk to the rim either at the spoke portions or between the spoke portions, or both.

A still further advantage and object is to give to the wheel body a certain degree of resiliency which when the wheel is in use and is going over more or less rough roads is desirable from the standpoint of improved riding qualities and durability, but which may also be utilized to give a radial contraction to the wheel body to facilitate the insertion of the wheel body in the rim and the welding thereto, as will be explained.

The above and other objects are attained by the above invention, which may be here briefly summarized as consisting in certain novel details of construction and combinations and arrangements of parts which will be described in the specification and set forth in the appended claims.

In the accompanying sheets of drawings wherein I have shown slightly different embodiments of the invention, Fig. 1 is a cross sectional view of half a wheel, the section being taken between two spokes;

Fig. 2 is a cross-sectional view of half a wheel with the cross-section through one of the spokes, the wheel body being here formed at its periphery with a flange which follows the contour of the spokes and of the web portions between the spokes and is designed to be secured by welding to the inner wall of the rim;

Fig. 3 is a detached edge view of the wheel body which is shown in Figs. 1 and 2;

Fig. 4 is a view of a portion of the wheel shown in the preceding views, looking toward the inner or rear side, with the brake drum removed;

Fig. 5 is a view corresponding to Fig. 1 and Fig. 6 is a view corresponding to Fig. 2 showing a different way in which the outer part of the disk or wheel body may be welded to the rim and also a modification in the manner in which the wheel attaching flange may be attached to the outer hub of the wheel body; and Fig. 7 is a view corresponding to Fig. 4 showing the construction illustrated in Figs. 5 and 6.

Referring first to Figs. 1 to 4, 10 represents a rim and 11 a wheel body of the disk type but with a form, shape or construction heretofore never imparted to a wheel of the disk type, so far as I am aware. This wheel body is formed from one sheet metal stamping. I preferably employ for this purpose a stamping of about one-sixteenth inch thickness, though the thickness may be varied for different sizes of wheel and for different sizes of vehicles. I prefer to use for this purpose a steel which does not readily crystallize, that is, a steel of high fatigue value and high endurance limit, such as chrome nickel steel having a tensile strength of 140,000 pounds per square inch.

Briefly stated, by suitably shaped dies and therefore by pressing operations, the disk is deformed and reshaped so as to have well defined spokes 12 formed therein and also the outer hub 13 into which the inner ends of the spokes merge, the outer hub being continuous at its outer end only, where it is preferably provided with an inturned flange 14 designed to be closed by an outer hub cap 15. The outer hub and hub cap, the former extending laterally outward beyond the rim, in this instance, completely surround the inner hub and therefore conceal from view the attaching devices or bolts by which the wheel is demountably secured to the flange 16 of the inner hub 17. It will be observed from both Figs. 3 and 4 that the cross-section of the spokes is smallest between their inner and outer ends and that the spokes flare laterally from the intermediate cross-section toward the rim and also toward the outer hub. Likewise, it will be seen particularly by reference to Figs. 3 and 4 that the spokes are U-shaped in form with the open sides of the U toward the rear and with the angles between the sides and the outer closed wall rather sharply defined. Also by reference to Figs. 1, 2, and 3 it will be seen that the outer closed sides or walls of the spokes flare outwardly from the rim to the points where the spokes merge into the outer hub and, in fact, in this instance to the inwardly turned flange 14.

In this instance, as in my prior applications, the outer hub portion is continuous only at its extreme outer end at and adjacent the flange 14, and inwardly of the continuous portion, this outer hub is formed by the concavo-convex portions which lie between the spokes, these portions being alternated with openings in line with the open spaces extending lengthwise of the U-shaped spokes. In this case, as in some of my prior applications, the general contour of the outer hub is conical, i. e., the outer hub enlarges or flares from its outer end to the inner side of the wheel, but it may have a substantially cylindrical contour.

As so far described, the wheel body is similar to the star-shaped spoke and outer hub unit of the spoke type wheels of my prior applications, but in this instance it differs therefrom in the respect that instead of the wheel body being star-shaped and with the spokes separated by spoke openings the spaces between the spokes are closed by integral web portions 18 which extend between and merge into the inner portions of the side walls of the spokes. In this instance, the spoke-connecting webs 18 are flat and they as well as the rear or inner portions of the spokes contiguous to the webs are forwardly inclined from the inner end of the outer hub to the periphery of the disk. The irregular contour of the periphery of the disk formed by the alternate U-shaped spoke portions and the web portions is most apparent from the edge view of the disk or wheel body illustrated in Fig. 3.

The disk may be secured to the rim in various ways, but I prefer to secure these parts together by welding. Furthermore, the welding method is capable of being utilized in a variety of different ways, one of which is illustrated in Figs. 1 to 4, wherein the irregular periphery of the disk is provided around the entire circumference with a laterally extending flange 19 which in this instance extends forwardly or toward the front side of the wheel. This flange in its entirety or portions of it are designed to be welded to the inner wall of the rim. I may weld to the rim only the spoke portions of the disk, or only the web portions, or both the spoke and web portions. The welding may be of a continuous nature all the way around or in isolated spots. In fact, the species of spot-welding which I term projection welding is utilized by me, in which event either the flange 19 or the rim is initially provided with a series of protuberances to facilitate the welding. I prefer that they be formed in the heavier gauge piece and, therefore, in this instance they will be formed in the bottom or inner portion of the rim.

I have heretofore mentioned the fact that the wheel body, whether it is star-shaped and distinctly of the spoke type, or whether it is of the disk type herein illustrated, has a certain degree of resilience by reason of the peculiar formation of the spokes and the outer hub. This resilience, which exhibits itself in a radial direction, as before mentioned, imparts a very desirable characteristic to my improved wheel in the avoidance of shocks when the wheel is in use, but it may be used to very great advantage in the welding operation explained above, for it allows the disk, by the application of pressure on the outer hub portion 13 between the spokes, to be contracted radially somewhat. This contraction is sufficient to enable the contracted disk to be inserted into the rim and in fact into the protuberances formed therein, and when the disk or wheel body is properly positioned in the rim ready for the welding operation, the contracting pressure is released and the flanged periphery of the disk bears very firmly against the protuberances in the rim, and as the welding operation proceeds, the protuberances are melted away and the disk expands to its natural shape and is at the conclusion of the welding operation effectively welded to the rim with the periphery of the disk in close contact with the inner wall of the rim all the way around.

Another way of welding my novelly formed disk or rim to the wheel body will be explained in the description of Figs. 5, 6, and 7.

My improved disk wheel herein illustrated may be supported on either one or two flanges of the inner hub precisely as illustrated in my prior applications referred to above, but in this instance it is supported on one flange of the inner hub and is secured thereto with this flange near the median plane of the rim, as illustrated in Figs. 1, 2, 5, and 6. To bring this about, I attach to the wheel body a wheel attaching member preferably in the form of a stamping illustrated at 20 in Figs. 1 to 4. The wheel attaching flange may be secured to the inner wall of the outer hub 13 between the spokes or it may be secured to the inner side of the wheel, i. e., to the webs 18 connecting the spokes, as illustrated in Figs. 1 to 4. The attaching member may be welded to the lower or inner portions of the webs 18 by the projection method of welding and preferably the projections are formed in the attaching member as it is preferably formed of a heavier gauge metal than is the disk 11. The peripheral portions 20a of the attaching member 20 where the latter overlaps the webs 18 (the overlapping areas being elliptically shaped, as indicated in Fig. 4) are provided with a suitable number of projections in the areas to be welded, and in one operation or in several, if desired, the attaching member is welded to the disk, the projections being, of course, melted away in the welding operation. It might be here mentioned also that the peripheral part of the disk may be welded to the rim in one or a plurality of welding operations.

From the outer portion of the attaching member 20 which is thus welded to the inner side of the disk just outwardly of the outer hub 13, the attaching member, as illustrated in Figs. 1 to 4, extends diagonally inward and forward, and inwardly of this portion there is a radial portion secured by any suitable means to the radially extending flange 16 of the inner hub 17, as, for example, by bolts 21 which are secured in the flange 16 and pass through suitable openings in the attaching member and have nuts 22 by which the parts are detachably clamped together. In this instance, the bolts 21 hold in place the brake drum 23 as well as demountably secure the wheel to the inner hub.

Instead of providing the periphery of the disk with a flange and welding all or portions of the flange to the inner wall of the rim by radially applied pressure, as previously described, I may provide suitable abutments on the inner side of the rim and weld portions of the rim thereto by the application of laterally applied pressure, the peripheral flange 19 then of course being unnecessary and being omitted. This mode of welding is illustrated in Figs. 5, 6, and 7 wherein the abutments to which the disk is welded are formed by welding to the inner wall of the rim stampings 24. I may in some instances simply depress portions of the rim inwardly and thus form the abutments, but at the present time I prefer to form the abutments in the manner illustrated, i. e., by welding to the inner wall of the rim the metal members 24, which may be stampings, as before stated. The projection method of welding is preferably utilized in fastening these abutments to the rim, this being indicated at 24a, the projections or protuberances being preferably formed in the stampings 24. In this instance, the spoke portions only of the outer periphery of the disk or wheel body are welded to the abutments 24 and therefore the flanged sides of the latter are shaped to be received into and to correspond to the contour of the U-shaped spokes with their flaring sides at the extreme outer ends of the spokes. With the use of properly shaped and properly located abutments such as described, the welding is accomplished by moving the wheel body into the rim (a contracting of the wheel body now being unnecessary) so that the outer ends of the spoke portions 12 will closely fit on the depending sides of the abutments 24, and then by the application of lateral pressure causing the outer ends of the spokes to be pressed firmly against projections indicated at 24b on the abutments, and by the use of suitable welding electrodes, the welding is readily accomplished. If desired, all the spoke portions may be simultaneously welded to the abutments 24, or one or any number of spoke portions may be welded at one time.

It will be understood that the wheel body, again designated 11 in Figs. 5, 6, and 7, with the spokes 12 and webs 18 between the spokes and with its outer hub 13 will be formed precisely like the wheel body of the first described construction, except for the omission of the flange 19 at the periphery of the wheel body of the construction illustrated in Figs. 1 to 4.

In Figs. 5, 6, and 7 I have shown a wheel attaching member or stamping 25 which is applied and secured to the wheel body somewhat differently than in the construction first described. In this instance, this attaching member has a peripheral flange 25a which is inclined in conformity with the taper of the conical outer hub 13 and is secured to the concavo-convex portions of the outer hub lying between the spokes. Thus a reenforcing action to the outer hub 13 is obtained more or less inwardly and in line with the spokes. It will be understood also that with the construction illustrated in Figs. 1 to 4, the attaching member 20 has a reenforcing action on the outer hub, even though it is secured to the wheel body on the inner side of the latter or to the webs 18. In either event, i. e., as in Figs. 1 to 4 or as in Figs. 5, 6, and 7, the wheel attaching member bridges the open spaces of the hollow spokes, i. e., ties the spokes together, where there are alternate outer hub portions and spoke openings.

To enable the attaching member 25 to be welded to the concavo-convex portions of the outer hub 13, either portions of the outer hub are bent to conform to the shape of the outer flange 25a of the attaching member in the regions to be welded together, or the conical wall of the outer flange of the attaching member is bent to conform to the concavo-convex shape of the portions of the outer hub between the spokes in the regions where the parts are to be welded together. In this instance, as clearly illustrated in Fig. 17, the flange 25a of the attaching member 25 is deformed at intervals, indicated at 25b, so as to conform to the shape of the contiguous parts of the concavo-convex portions of the outer hub 13 between the spokes and one or the other of the two parts is provided with projections as the projection method of welding is here again preferably utilized. The projections are preferably formed in the thicker member, i. e., on the flange 25a, as indicated at 25c in Figs. 5 and 7. Prior to the welding operation, the flange 25a of the attaching member is forced into the outer hub 13 with the projections on the deformed portions 25b now closely fitting and engaging the concavo-convex portions of the outer hub 13 between the spokes. This places the parts under severe pressure, and during the welding operation the projections are melted away leaving the attaching member securely fastened to the outer hub so as to form not only a convenient means of securing the wheel to the flange 16 of the inner hub 17 but also a reenforcement for the outer hub, as explained. In this instance, as before, the inner part of the attaching member 25 is secured to the flange 16 of the outer hub in substantially the median plane of the rim by bolts 21 which may, as before, secure the brake drum 23 in place.

Thus it will be seen that by the constructions herein illustrated the objects stated at the beginning of the specification are attained very effectively, and it will be obvious also that my invention is susceptible of many modifications, part of which I have herein illustrated, but others of which will occur to one skilled in the art. I therefore do not desire to be confined to the precise details and arrangements illustrated but aim in my claims to cover all modifications which do not involve a departure from the spirit and scope of the invention in its broadest aspects.

Having thus described my invention, I claim:

1. In a vehicle wheel, a rim, a sheet metal body in the form of a disk having spokes and an outer hub pressed therein, the spokes extending outwardly to the periphery thereby forming an irregular periphery composed of spoke portions and intervening web portions, the outer walls of the spokes flaring axially outwardly and merging with the outer hub, the portions of the outer hub between the spokes being concavo-convex, the outer hub having an opening at its outer end adapted to be closed by a hub cap, and an inwardly extending wheel attaching member secured to said sheet metal body adjacent the inner face of the wheel and adapted to be detachably secured to an inner hub by means located within the outer hub.

2. In a vehicle wheel, a rim, a sheet metal body in the form of a disk having spokes and an outer hub pressed therein, the spokes extending outwardly to the periphery thereby forming an irregular periphery composed of spoke portions and intervening web portions, the outer walls of the spokes flaring axially outwardly, the outer and side walls of the spokes merging with the outer hub, the outer hub having an opening at its outer end surrounded by an inwardly directed flange, and a wheel attaching member secured to said sheet metal body adjacent the inner face of the wheel and adapted to be detachably secured to an inner hub by means located within the outer hub.

3. In a vehicle wheel, a rim, a sheet metal body in the form of a disk having spokes and an outer hub pressed therein, the spokes extending outwardly to the periphery thereby forming an irregular periphery composed of spoke portions and intervening web portions, the outer walls of the spokes flaring outwardly, the side walls of the spokes and the portions of the outer hub between the spokes forming sweeping curves extending from the end of one spoke to the end of the adjoining spoke, the outer hub having an opening at its outer end adapted to be closed by a hub cap, and a wheel attaching member secured to said wheel body adjacent the inner face thereof and adapted to be detachably secured to the inner hub.

4. In a vehicle wheel, a rim, a sheet metal body in the form of a disk having spokes and an outer hub pressed therein, the spokes extending outwardly to the periphery thereby forming an irregular periphery composed of spoke portions and intervening web portions, the outer walls of the spokes flaring axially outwardly, the outer and side walls of the spokes merging with the outer hub, and a wheel attaching member secured to the wheel body adjacent the inner face of the wheel and between the spokes, said member being adapted to be detachably secured to an inner hub.

5. In a vehicle wheel, a rim, a sheet metal body in the form of a disk having spokes and an outer hub pressed therein, the spokes extending outwardly to the periphery thereby forming an irregular periphery composed of spoke portions and intervening web portions, the outer walls of the spokes flaring outwardly, the side walls of the spokes and the portions of the outer hub between the spokes forming sweeping curves extending from the end of one spoke to the end of the adjoining spoke, and a wheel attaching member positioned adjacent the inner face of the wheel and secured to said wheel between the spokes, said wheel attaching member being adapted to be detachably secured to an inner hub by means positioned within the outer hub.

6. In a vehicle wheel, a rim, a sheet metal body comprising a deeply dished disk having channel-shaped spokes and an outer hub pressed therein and comprising web portions disposed intermediate each pair of adjacent spokes, the spokes and web portions extending radially outwardly from the outer hub to the periphery thereby forming a waved periphery composed of spoke portions and intervening web portions, the axially outer walls of the spokes flaring axially outwardly and merging with the axially outer portions of the outer hub, the portions of the outer hub between the spokes being radially outwardly concave, the outer hub having an opening at its axially outer end adapted to be closed by a hub cap, said body having a substantially radial bolting-on flange disposed within and extending radially inwardly from the walls of said outer hub and adapted to be detachably secured to an inner hub by means located within the outer hub, to secure the body onto such inner hub.

7. In a vehicle wheel, a rim, a sheet metal body comprising a disk having channel-shaped spokes and an outer hub pressed therein and comprising web portions disposed intermediate each pair of adjacent spokes, the spokes and web portions extending radially outwardly from the outer hub to the periphery thereby forming a waved periphery composed of spoke portions and intervening web portions, the axially outer walls of the spokes flaring axially outwardly to curvilinearly merge with the outer hub, the portions of the outer hub between the spokes being substantially concavo-convex, the outer hub being annularly continuous at its axially outer end and provided with a central opening adapted to be closed by a hub cap, said outer hub comprising all parts of the disk disposed radially inwardly from said web portions and being of generally deeply dished conical form, the diameter of its outermost periphery comprising the greater portion of the diameter of of the entire body, said outer hub having spoke roots pressed therefrom merging curvilinearly with said spokes, said body having a substantially radial bolting-on flange disposed within and extending radially inwardly from the walls of said outer hub and adapted to be detachably secured to an inner hub by means located within the outer hub.

8. In a vehicle wheel of the demountable bolted on type, an axially inwardly located load supporting stamping supported on the inner wheel hub together with an axially outwardly located member comprising a unitary sheet metal stamping having a deeply dished general conical spoke bearing nave portion, and having channel shaped spokes extending radially outwardly therefrom and comprising web portions disposed intermediate each pair of adjacent spokes, the axially outer walls of the spokes flaring axially outwardly and merging with the axially outer portions of the nave, the nave portion emanating from the axially outermost extremity of the wheel body and extending radially outwardly and axially inwardly between the spokes a distance relatively great as compared with the axial depth of the spoke bodies radially outwardly of the nave portion, the nave having at its axially outer end an opening adapted to be closed by a hub cap, the inner load supporting stamping being secured to radially inner portions of said unitary stamping and adapted to be detachably secured to an inner hub by means located within the nave and accessible through the opening in the axially outer end of the nave.

9. In a vehicle wheel of the demountable bolted on type comprising an axially inwardly located load supporting stamping having a substantially radially extending bolting-on flange adapted to be detachably secured to an inner hub by bolting on means, together with an axially outwardly located member comprising a unitary sheet metal body having a deeply dished generally conical spoke bearing nave portion and a plurality of channel shaped spokes pressed therein, and comprising web portions disposed intermediate each pair of adjacent spokes, the axially outer walls of the spokes flaring axially outwardly to curvilinearly merge with the nave, the portions of the nave between the spokes being substantially concavo-convex, the nave being annularly continuous at its axially outer end and terminating radially outwardly of the bolting on means and providing an opening through which the bolting on means can be reached, said opening being adapted to be closed by a hub cap, said nave comprising all parts of the stamping disposed radially inwardly of the spoke portions, the diameter of its outermost periphery comprising the greater portion of the diameter of the entire body, said nave having spoke roots pressed therefrom and curvilinearly merging with the spokes the load supporting stamping being secured to radially inner portions of the unitary metal body.

10. A sheet metal wheel body of the hub demountable bolted-on disc type, comprising a unitarily formed sheet metal stamping in the form of a sheet metal disc, said disc being substantially of deeply dished concave conoidal form and terminating peripherally in a substantially continuous annular portion adapted to be secured to the radially inner surface of a wheel rim and also having a radially inwardly and axially outwardly disposed annular apical portion, said body provided with a single interiorly disposed bolting-on flange extending radially inwardly from said disc for rigidly securing said disc onto a wheel inner hub flange, said bolting-on flange being disposed so as to be readily accessible through a central aperture of said apical portion, said aperture of said apical portion adapted for closure by a wheel hub cap seated therein, portions of said disc intermediate its said peripheral and apical portions being pressed to form substantially radially extending spoke-like portions of generally channeled form, the channels thereof being presented axially inwardly of the disc, the axially outer faces of said spoke-like portions being so formed as to gradually incline axially outwardly and radially inwardly, and merging gradually with said annular apical portion, the adjacent lateral walls of adjacent spoke-like portions being joined by curvilinearly formed connecting portions of the disc which extend axially outwardly and radially inwardly to merge with said disc apical portion, the axial depth of the spoke-like portions increasing substantially in depth proceeding radially inwardly, and the axial depth of said spoke-like portions at their radial inner terminations being substantially as great as the radial extent of said portions.

11. A sheet metal wheel body of the hub demountable bolted-on disc type, comprising a unitarily formed sheet metal stamping in the form of a sheet metal disc, said disc being substantially of deeply dished concave conoidal form and terminating peripherally in a substantially continuous annular portion adapted to be secured to the radially inner surface of a wheel rim and also having a radially inwardly and axially outwardly disposed annular apical portion, said body provided with a single interiorly disposed bolting-on flange extending radially inwardly from said disc for rigidly securing said disc onto a wheel inner hub flange, said bolting-on flange being disposed so as to be readily accessible through a central aperture of said apical portion, said aperture of said apical portion adapted for closure by a wheel hub cap seated therein, portions of said disc intermediate its said peripheral and apical portions being pressed to form substantially radially extending spoke-like portions of generally channeled form, the channels thereof being presented axially inwardly of the disc, the axially outer faces of said spoke-like portions being so formed as to gradually incline axially outwardly and radially inwardly, and merging gradually with said annular apical portion, said disc comprising sheet metal web portions disposed intermediate of and joining the edges of said spoke portions, the axial extent of said disc in the region of said apical portion being in excess of one-third of the radial extent of the portion of the disc disposed radially therebeyond to provide a high section modulus to stresses acting laterally of the wheel.

OSCAR U. ZERK.